United States Patent
Smith et al.

(10) Patent No.: US 7,785,561 B1
(45) Date of Patent: Aug. 31, 2010

(54) RECOVERY OF HIGH PURITY PBO

(75) Inventors: W. Novis Smith, Philadelphia, PA (US); Steven A. Kinsbursky, Anaheim, CA (US)

(73) Assignees: Toxco. Inc, Anaheim, CA (US); Kinsbursky Brothers, Inc., Anaheim, CA (US)

( * ) Notice: Subject to any disclaimer, the term of this patent is extended or adjusted under 35 U.S.C. 154(b) by 0 days.

(21) Appl. No.: 12/378,636

(22) Filed: Feb. 18, 2009

(51) Int. Cl.
*C01G 21/02* (2006.01)

(52) U.S. Cl. .......................... 423/619; 423/89; 423/92; 423/93; 429/49; 429/225; 429/228

(58) Field of Classification Search ................. 423/89, 423/92, 93, 619; 429/49, 225, 228
See application file for complete search history.

(56) References Cited

U.S. PATENT DOCUMENTS 4,096,045 A * 6/1978 Ahonen et al. .............. 205/600
7,507,496 B1 * 3/2009 Kinsbursky et al. ........... 429/49

FOREIGN PATENT DOCUMENTS

SU        1355613 A  * 11/1987

* cited by examiner

*Primary Examiner*—Melvin C Mayes
*Assistant Examiner*—Melissa Stalder
(74) *Attorney, Agent, or Firm*—John Lezdey

(57) ABSTRACT

A process for producing high purity lead oxide from impure lead compounds particularly from waste lead battery paste which includes an oxidation-reduction step. The process results in a reduction of impure lead compounds to the +2 valence state and metal particle contaminants are oxidized to the +2 state.

12 Claims, No Drawings

RECOVERY OF HIGH PURITY PBO

FIELD OF THE INVENTION

A process for recovering high purity lead oxides (PbO) from a composition containing impure lead compounds with mixed oxidation states without smelting or acid fluxing. The process is particularly useful in recovery of the lead from waste lead battery paste.

BACKGROUND OF THE INVENTION

The recovery or conversion of various mixtures or impure lead compounds and possibly including lead metal to a pure commercial grade of lead oxide (PbO, massicot or litharge) of high purity (99.7+%) presents many unsolved problems. This conversion of lead acid battery pastes (lead sulfate, red lead, $Pb_3O_4$, lead sulfate, lead fluoride, lead chloride, lead carboxylate salts, etc.) often requires a reduction of the impure lead compound to the +2 valence state from the +3 (red lead) or the +4 state. However, in some cases, the requirement is also for the oxidation of any lead metal particle contaminates to the +2 state so that the total lead content is in the same oxidation state for achieving high purity of the product. Lead oxide (PbO) is the plus two valence state oxide of lead and is one of the principal commercial lead compounds of commerce. It can come in several versions or phases particularly litharge (orange red color) or massicot (white or pale yellow) and an amorphous white version. Chemically pure PbO (99.7+%) represents an ideal commercial lead compound to convert any mixture or impure lead compound for recovery or for purification purposes.

The largest source of impure or mixed lead compounds requiring recovery or recycling are the lead acid battery pastes which can be a mixture of red lead and lead sulfates and can contain lead dioxide and finely divided lead metal and other lead oxides. In addition, the complete removal of other known metallic impurities such as antimony, barium, iron, and potentially arsenic, tellurium, silver is required. However, other contaminated lead compounds or mixtures of lead compounds can also present a problem for recovery and purification. Usually all of these impure lead compounds, and the lead acid battery pastes are sent to lead smelters where they are mixed with carbon and heated to 800-1000° C. to form lead metal and to remove large amounts of sulfate forming sulfur dioxide and carbon dioxide which must be fluxed and sparged with air to remove impurities such as antimony, arsenic, iron, and barium which are present in lead acid battery pastes as a impure toxic slag which requires disposal as a hazardous material. This is both an energy intensive process and a highly polluting process due to gaseous and particulate emissions. The disposal of the solid wastes from the slags is also a major concern.

Lead acid electrochemical cells which are otherwise known as "lead-acid batteries" are commonly used to store and deliver electrical energy. For example, lead acid electrochemical cells are normally employed in vehicles (e.g. cars, trucks, boats, aircraft, and the like) for ignition, lighting, and other related purposes.

Conventional lead-acid electrochemical cells include electrically-conductive positive and negative current collectors typically manufactured in the form of foraminous (porous) metallic grids with coatings of a paste composition which are manufactured from a lead alloy or elemental lead (99.9%-99.99% purity lead) as noted in U.S. Pat. No. 3,951,688. The positive and negative pastes are typically produced from one or more particulate lead-containing compositions which may consist of, for example, lead (Pb) or lead compounds (e.g. oxides such a PbO, $PbO_2$ and/or $Pb_3O_4$ "red lead" and $PbSO_4$. The selected lead-containing compositions are then combined with a paste "vehicle" (e.g. water) and various other optional ingredients including sulfuric acid. Other additives of interest comprise expander materials as discussed in U.S. Pat. No. 4,902,532 which include barium sulfate, carbon black, and lignosulfonate which are primarily used in connection with the negative paste.

The paste composition positioned on the positive current collector to form the positive plate in an electrochemical cell is typically characterized as the "positive paste", while the paste composition located on the negative current collector to produce the negative plate is known as the "negative paste". Further information regarding these items and other characteristics of battery paste compositions in general are presented in U.S. Pat. No. 4,648,177 which is incorporated herein by reference. Likewise, methods of applying the paste compositions listed above to the positive and negative current collectors are specifically discussed in U.S. Pat. Nos. 3,894,886; 3,951,688 and 4,050,482 which are also incorporated by reference.

In 1915, in the U.S. Pat. No. 1,148,062, a process is described for the recovery of lead from exhausted batteries. According to this patent, extracted spent battery pastes are transformed into lead oxides by calcinations and desulfurization. However, the oxides produced are not of high purity.

According to U.S. Pat. No. 4,222,769, an extracted spent battery paste is desulfurized and then transformed into metallic lead by roasting in the presence of a carbon reducing agent.

In U.S. Pat. No. 4,769,116, a paste is obtained from exhausted lead-acid batteries and treated with sodium hydroxide to produce a solution of sodium sulfate and a desulfurized paste. Pure metallic lead is further recovered from the desulfurized paste by electrowinning.

U.S. Pat. No. 5,211,818 discloses a process wherein the paste sludge resulting from the exhausted batteries is treated with a solution of ammonium sulfate and the metallic lead constituent is recovered by electrowinning.

International Publication No. WO99/44942 discloses a process of producing lead monoxide from spent lead batteries using fluxing agents and an organic reducer in the calcinations step at a temperature of 400° C.-450° C.

Currently mixed lead oxides recovered from battery lead oxide pastes are mixed with carbon and smelted directly in a furnace to make molten lead. Then the resulting lead in ingot form is shipped to a plant which has a Barton reactor or ball mill process to be oxidized to the leady lead oxide. The material is subsequently oxidized in another furnace to red lead or pure litharge depending upon temperature and other conditions. This prior art procedure is more costly, requires greater energy expenditure, and requires pollution control.

SUMMARY OF THE INVENTION

The present invention relates to a process for producing high purity lead oxide from waste lead products such as waste battery paste. The process comprises the steps of:

A. slurrying waste lead products which contain impure lead compounds in an acidic medium;

B. adding sufficient alkali metal halide salt to reduce all lead to a valence of +2;

C. filtering the composition from Step B;

D. washing the filter cake from Step C to remove soluble salts;

E. treating the filter cake from Step D with an alkali hydroxide solution, preferably sodium hydroxide or potassium hydroxide, and then F. washing the product from Step E and recovering high purity lead oxide.

Advantageously, the acidic medium in Step A is dilute sulfuric acid.

It is a general object of the invention to obtain substantially pure lead oxide (PbO) from a mixture of lead oxides.

It is also an object of the invention to obtain substantially pure lead oxide from spent electrode paste and removing contaminants.

It is another object of the invention to convert mixed lead oxides recovered from lead acid batteries directly to lead oxide (PbO).

It is yet another object of the invention to prepare positive and/or negative current collectors utilizing the lead oxide obtained by the present invention.

It is a further object of the invention to prepare lead oxide from recovered lead oxides.

It is still another object of the invention to provide lead oxide paste used in making electrodes for lead acid batteries.

DESCRIPTION OF THE PREFERRED EMBODIMENTS

According to the present invention lead oxides obtained from waste acid battery paste can be obtained by an oxidation reduction reaction with sulfuric acid or hydrochloric acid to form lead oxide (litharge) and solubilizing the contaminants which include antimony, arsenic, iron and barium.

The process comprises the steps of:

A. slurrying waste lead products which contain impure lead compounds in an acid medium, preferably sulfuric or hydrochloric acid; preferably the acid medium has a pH less than 1, dilute sulfuric acid is preferred.

B. Adding sufficient alkali halide salt to reduce all of the lead to a valence of plus 2. The halide is preferably a chloride or a bromide. Preferably potassium halide or sodium halide is used. More preferable is sodium chloride or potassium chloride. About 50% by weight of alkali halide salt based on the solid compound waste is used.

C. After the addition of the alkali halide salt there is an evolution of gases so that it is preferable to heat the slurry to remove all of the gases and cool and filter the slurry;

D. The resulting filter cake is washed with a dilute acid, preferably with 15% sulfuric acid and then with water until all the soluble salts have been removed;

The present invention provides low cost, energy efficient, low temperature chemical process and new chemistry which directly converts lead compounds and mixtures of lead compounds with mixed oxidation states (0, 2, 3, and 4) and even contaminated with finely divided lead metal directly into high purity PbO with a purity of >99.7%. This process also removes the most difficult to remove contaminants found in lead acid battery pastes including antimony, arsenic, barium, and sulfate.

A preferred feature of the invention involves a two step process.

The first step of the process consists of taking a finely divided waste lead mixture of compounds (waste lead acid battery paste is usually dark red brown) (preferably −200 mesh) slurring it in an equal weight >15% sulfuric acid (preferably 30%) and then with good stirring adding about 50% by weight salt (NaCl) (based on the solid lead compound waste) slowly over a hour period. The lead acid battery paste usually contains about 0.3% by weight barium and 0.3% antimony which are normally impossible to remove without smelting and fluxing along with varying amounts of iron and with large amounts of sulfate.

When the addition is complete and chlorine gas has effectively ceased to evolve vigorously (about 1 hour), the slurry is heated to 100° C. to remove all gases and then cooled to 20° C. and filtered. The wet white filter cake is washed with 15% sulfuric acid twice and then with water until free of all soluble salts. The white filter cake after washing is a mix of lead sulfate, lead chloride and PbO and free of antimony, barium, and iron and all other metallic impurities which have dissolved into the strong acid liquid phase under these reducing conditions.

This step involves the following equation:

Red $Pb_3O_4$ (mostly +3 oxidation state formally and partially as the sulfate)+2 $HCl+H^++H_2O \rightarrow$ white mixed PbO (+2 partially as the sulfate and chloride and oxide)+$Cl_2$

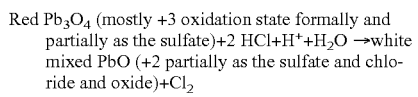

Surprisingly, the vigorous evolution of chlorine on the slow addition of NaCl to the strong acid slurry of the highly contaminated red lead sulfate lead acid battery paste mixture. This shows that the chloride anion is oxidized and that the lead compounds are reduced to the +2 state with the formed PbO present as the mix of +2 valence chloride, sulfate and oxide. (Any small amounts of finely divided lead metal if present are reacted under these conditions to lead sulfate.). The acid is also partially consumed since for this oxidation reduction reaction only occurs rapidly under strongly acid conditions (pH<1). The chlorine gas that is evolved is scrubbed into aqueous sodium hydroxide forming bleach which is recycled.

According to the second step, the wet filter cake from the first step is slurried in an equal amount of water and sufficient 45% potassium hydroxide (30% by weight of lead compound) or equivalent sodium hydroxide solution is added. To convert all lead compounds to PbO and maintain the solution at $pH \geq 13$. The solution is heated to 100° C., stirred two hours and then filtered. The white cake is washed twice with 15% Base and then water. The white PbO to yellow cake (messicote version) is then dried and the yield is stoichiometric based on the starting lead content. The antimony and barium content is less than 100 ppm each. All other impurities combined are less than 100 pm. The overall purity of the PbO is >99.8% and typically >99.9%.

The Paste Compositions of the Present Invention

The lead oxide compositions of the present invention can be used to prepare either the positive or negative pastes for lead acid battery electrodes. The lead oxide is used for the negative paste for the positive paste. The pastes contain two basic ingredients. These ingredients are 1) the lead oxide compositions of the present invention, and 2) a paste vehicle. The lead oxide compositions will typically have a particle size of about 0.1-10 microns in a representative and non-limiting embodiment. A representative positive paste will typically include about 3-25% by weight of paste vehicle therein.

Water is a representative and preferred material suitable for use as the paste vehicle for the positive paste. In addition, the positive paste can contain sulfuric acid (e.g. about 0.01-18 M), if needed. The sulfuric acid is used in situations where greater paste porosity is desired. The positive paste may contain additives or expanders which are known in the art which may improve the consistency or performance of the paste in an amount of about 0-5% by weight.

The following examples are presented in order that those skilled in the art may better understand how to practice the invention. The examples are merely presented by way of illustration only, and are not intended to limit the invention.

Example 1

86 g (92% solids) of a damp dark red lead acid battery paste was recovered from a lead acid battery recycling process and slurried in 50 ml distilled water and 10 g of 15% sulfuric acid. The starting solid paste contained 0.4% antimony and 0.3% barium by weight solids along with iron and high sulfate as major impurities to be removed along with minor traces of other metals also to be removed. This slurry was wet screened through −200 mesh to remove any traces of coarser particles including plastics and paper from the battery case. (Less than 2% weight by the starting solids remained on the screen.) The screened slurry was then filtered and the resulting damp dark red brown filter cake was added along with 150 g of 15% by weight sulfuric acid (recovered lead acid battery electrolyte) to a 250-ml reaction flask equipped with a stirrer and thermometer and a vent tube. An additional 52 g concentrated sulfuric (100%) was added which warmed the slurry. The solution was cooled back to 50° C. and 5 g of sodium chloride (salt) was added. Chlorine gas formed immediately and a gentle evolution of the gas was vented through the vent tube into a dilute sodium hydroxide solution along with a slight nitrogen purge to prevent suck back. There was no temperature rise due to the reaction. This step was repeated every 5 to 10 minutes over a period of an hour and a total of 40 g sodium chloride were added. The now off gray white reaction slurry was stirred two hours and then heated to 100-105° C. to remove any trace of gasses and then cooled to 20° C. and filtered. The white filter cake was washed twice with 15% sulfuric acid and then with Dl water until the washes were neutral. All of the iron, antimony, barium and other metallic impurities have been removed at this point and are soluble in the strong acid under the reducing conditions.

The damp white cake was then repulped in 100 ml Dl water and 45 g of 45% potassium hydroxide solution added. The slurry was then heated with stirring to 90° C. and stirred for 2 hours. The pH was checked periodically to be sure that it was maintained at 13-14. An additional 5 g of 45% potassium hydroxide solution was added drop wise as needed to maintain a pH of 13-14. The solution was protected from the air to minimize carbonate formation and yellow color formation. The solution was cooled to 30° C. and filtered. The filter cake was washed twice with small amounts of 1% KOH and then with Dl water until the filtrate was pH 7-8. The white to pale yellow solid PbO (messicote version) was dried in an oven and weighed. The yield was 51 g which is approximately theoretical based on originally contained lead in the paste. Analysis of the off white solid showed: antimony, 40 ppm; barium, 40 ppm; iron, 10 ppm; all other metallic impurities combined less than 100 ppm; chloride, 10 ppm; sulfate, 20 ppm. The overall purity was 99.9+% by weight.

Example 2

87 g (90% solids) of a camp dark red lead acid battery paste recovered from a lead acid battery recycling process was slurried in 80 ml distilled water and 10 g of 15% sulfuric acid. The starting solid paste contained 0.4% antimony and 0.3% barium by weight solids along with iron and high sulfate as major impurities to be removed along with minor traces of other metals also to be removed. This slurry was wet screened through −200 mesh to remove any traces of coarser particles including plastics and paper from the battery case. (Less than 2% by weight of the starting solids remained on the screen.) The screened slurry was then filtered and the resulting damp dark red brown filter cake was added along with 150 g of 15% by weight sulfuric acid (recovered lead acid battery electrolyte) to a 250 ml reaction flask equipped with a stirrer and thermometer and a vent tube. An additional 48 g concentrated sulfuric (100%) was added which warmed the slurry. The solution was cooled back to 30° C. and 5 g of sodium chloride (salt) was added. Chlorine gas formed immediately and a gentle evolution of the gas was vented through the vent tube into a dilute sodium hydroxide solution along with a slight nitrogen purge to prevent suck back. There was no temperature rise due to the reaction. This step was repeated every 5 to 10 minutes over a period of an hour and a total of 45 g sodium chloride was added. The now off gray white reaction slurry was stirred 30 minutes and then heated to 100-105° C. to remove any trace of gasses and then cooled to 15° C. and filtered. The white filter cake was washed once with 15% sulfuric acid and then with Dl water until the washes were neutral. (Note that all of the iron, antimony, barium, and other metallic impurities have been removed at this point and are soluble in the strong acid under the reducing conditions).

The damp white cake was then repulped and 150 ml Dl water and 40 g 45% potassium hydroxide solution added. The slurry was then heated with stirring to 90° C. and stirred for 2 hours. The pH was checked periodically to be sure that it was maintained at 12-13. Additional 45% potassium hydroxide solution was added drop wise as needed. The solution was protected from the air to minimize carbonate formation and yellow color formation. The solution was cooled to 50-60° C. and filtered. The filter cake was washed twice with small amounts of 15% KOH and then with Dl water until the filtrate was pH 7-8. The white to pale yellow solid PbO (messicote version) was dried to an oven and weighted. The yield was 51 g which is approximately theoretical based on originally contained lead in the paste. Analysis of the off white solid showed: antimony, 600 ppm; barium, 400 ppm; iron, 10 ppm; all other metallic impurities combined less than 200 ppm; chloride, 30 ppm; sulfate, 20 ppm. The overall purity was 99.8+% by weight.

What is claimed is:

1. A process for producing high purity lead oxide (PbO) from a composition consisting of waste lead battery paste which comprises the steps of:
   A. slurrying the lead battery paste in an aqueous acidic medium;
   B. adding sufficient alkali metal halide salt to reduce all lead to a valence of +2;
   C. filtering the composition from Step B;
   D. washing a filter cake from Step C to remove soluble salts;
   E. treating the filter cake from Step D with an alkali hydroxide solution and then
   F. washing the product from Step E and recovering high purity lead oxide.

2. The process of claim 1 wherein Step 1 is slurried at a pH less than 1.

3. The process of claim 2 wherein the composition is slurried in an aqueous sulfuric acid.

4. The process of claim 1 wherein the alkali metal halide in Step B is an alkali chloride.

5. The process of claim 1 wherein the composition from Step A was screened to remove coarse material and the screened slurry is further treated with sulfuric acid prior to Step B.

6. The process of claim 5 wherein the resulting slurry after Step B is heated to remove any gas formed.

7. The process of claim 1 wherein the filter cake is washed with dilute sulfuric acid and water.

8. The process of claim 7 wherein the sulfuric acid is greater than 15%.

9. The process of claim 1 wherein the alkali metal hydroxide of Step E is potassium hydroxide.

10. The process of claim 9 wherein the pH is at 12-13.

11. The process of claim 10 including washing with water after the potassium hydroxide is added to have a pH of 7-8.

12. The process of claim 1 wherein in Step E the alkali hydroxide solution comprises 45% potassium hydroxide.

* * * * *